United States Patent
Hauptmann

(10) Patent No.: US 11,435,142 B2
(45) Date of Patent: Sep. 6, 2022

(54) MICROWAVE FURNACE AND A METHOD OF SINTERING

(71) Applicant: 3M INNOVATIVE PROPERTIES COMPANY, St. Paul, MN (US)

(72) Inventor: Holger Hauptmann, Sindelsdorf (DE)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 1112 days.

(21) Appl. No.: 16/061,271

(22) PCT Filed: Dec. 13, 2016

(86) PCT No.: PCT/US2016/066368
§ 371 (c)(1),
(2) Date: Jun. 11, 2018

(87) PCT Pub. No.: WO2017/106183
PCT Pub. Date: Jun. 22, 2017

(65) Prior Publication Data
US 2020/0292235 A1    Sep. 17, 2020

(30) Foreign Application Priority Data
Dec. 16, 2015 (EP) .................................... 15200347

(51) Int. Cl.
*F27B 17/02* (2006.01)
*A61C 7/12* (2006.01)
(Continued)

(52) U.S. Cl.
CPC .............. *F27B 17/025* (2013.01); *A61C 7/12* (2013.01); *A61C 13/203* (2013.01); *F27D 19/00* (2013.01);
(Continued)

(58) Field of Classification Search
CPC ....... A61C 7/12; A61C 13/203; F27B 17/025; F27D 19/00; H05B 6/645; H05B 6/6491; H05B 6/806; H05B 2206/046
See application file for complete search history.

(56) References Cited

U.S. PATENT DOCUMENTS 7,217,909 B2    5/2007  Fusejima
2007/0023971 A1*  2/2007  Saha .................... C04B 35/64
                                                 264/432
(Continued)

FOREIGN PATENT DOCUMENTS

CN    101644531    2/2010
EP    2149347      2/2010
(Continued)

OTHER PUBLICATIONS

International Search Report for PCT International Application No. PCT/US2016/066368, dated Aug. 7, 2017, 5 pages.

*Primary Examiner* — Nahida Sultana

(57) ABSTRACT

A microwave furnace has a furnace chamber formed between a chamber housing and a sintering platform for an object to be sintered. A microwave source is arranged for emitting microwaves into the furnace chamber. The microwave furnace further has a susceptor that comprises a material which over a temperature range of the material of at least 23 C to 700 C couples into microwaves. The susceptor and the furnace chamber are movable relative to each other between a first position, in which the susceptor is positioned relative to the furnace chamber, and a second position in which the susceptor is positioned further retracted from the furnace chamber relative to the first position. The invention helps providing a zirconia material with a relative homogeneous material structure.

16 Claims, 3 Drawing Sheets

(51) Int. Cl.
*A61C 13/20* (2006.01)
*F27D 19/00* (2006.01)
*H05B 6/64* (2006.01)
*H05B 6/80* (2006.01)

(52) U.S. Cl.
CPC .......... *H05B 6/645* (2013.01); *H05B 6/6491* (2013.01); *H05B 6/806* (2013.01); *H05B 2206/046* (2013.01)

(56) References Cited

U.S. PATENT DOCUMENTS

| | | | |
|---|---|---|---|
| 2008/0083748 A1* | 4/2008 | Thyssen | B22F 3/105 219/678 |
| 2009/0079101 A1 | 3/2009 | Laubersheimer | |
| 2010/0025394 A1 | 2/2010 | Jussel | |
| 2010/0025395 A1* | 2/2010 | Laubersheimer | H05B 6/80 219/759 |
| 2011/0006450 A1* | 1/2011 | Stephan | A61C 13/203 264/16 |
| 2012/0012577 A1 | 1/2012 | Jussel | |
| 2012/0080425 A1* | 4/2012 | Jussel | F27B 17/025 219/759 |
| 2013/0213955 A1* | 8/2013 | Jussel | H05B 6/6473 219/681 |
| 2017/0074766 A1* | 3/2017 | Lambert | H05B 6/6464 |

FOREIGN PATENT DOCUMENTS

| | | |
|---|---|---|
| EP | 2407122 | 1/2012 |
| GB | 2263967 | 8/1993 |
| JP | H04-092870 A | 3/1992 |
| JP | 2008-128491 A | 6/2008 |
| JP | 2010-025452 A | 2/2010 |
| KR | 10-0841039 B1 | 6/2008 |

\* cited by examiner

MICROWAVE FURNACE AND A METHOD OF SINTERING

FIELD OF THE INVENTION

The invention relates to a microwave furnace, and in particular to a microwave furnace having a susceptor which can be selectively positioned in and outside the furnace chamber for selectively sintering an object via microwave energy or thermal transfer (for example via thermal radiation). The invention further relates to a method of sintering.

BACKGROUND ART

Dental restorations are often made of or include a dental ceramic material. Dental ceramic material can provide dental restorations with a color that resembles the color of natural teeth.

Dental restorations are often manufactured by using automated processes, which typically include the capturing of the shape of a patient's teeth, designing the dental restoration based on the captured shape by computer-aided design (CAD) and manufacturing the dental restoration on an automated Computer Numerical Controlled (CNC) machine or a computer controlled build-up process.

A dental restoration made from a ceramic material is typically obtained by machining a pre-cursor of the dental restoration from a blank made of pre-sintered blank (having an open-porous material structure) and subsequently sintering the dental restoration precursor toward full density to form the dental restoration. Further, many build-up processes provide a dental restoration precursor having an open-porous material structure which needs to be sintered to form the dental restoration.

There is a general desire to keep the sintering time as short as possible and therefore there is a desire to particularly minimize the time for heating up the object to be sintered from a lower temperature to a required final sintering temperature.

A so called non-liquid sintering of an inorganic solid starts at temperatures above 0.5 to 0.6 of the melting temperature of that solid. Heat is required to allow a transport of mass or material within the lattice of the solid. This can occur by various mechanisms, including surface diffusion, grain boundary diffusion or bulk diffusion as well as evaporation and condensation effects. One or more of these mechanisms cause the conversion from a porous body to a desired fully dense body.

There are also approaches to use microwave furnaces, which however typically cannot be used for some ceramic materials, for example including zirconia, which do not significantly couple into microwaves in certain temperature ranges. There are further approaches which use a so-called susceptor that is brought in the vicinity of the object to be sintered. The susceptor is typically made of a material that couples into microwaves. Thus, microwave energy is typically converted by the susceptor into heat, which is emitted by the susceptor to the material to be sintered mainly by thermal radiation.

Although existing approaches provide certain advantages there is still a need for a sintering furnace and sintering method which allows for rapid sintering of ceramics, in particular dental ceramics like zirconia, at a maximized sintering quality (with respect to homogeneity, translucency and strength).

SUMMARY OF THE INVENTION

The invention in one aspect relates to a microwave furnace. The microwave furnace of the invention comprises a furnace chamber that is formed between a chamber housing and a sintering platform for an object to be sintered. The microwave furnace comprises a microwave source which is arranged for emitting microwaves into the furnace chamber. The microwave furnace further has a susceptor that comprises or is formed of a material which over a temperature range of the material of at least 23° C. to 700° C. couples into microwaves. The susceptor and the furnace chamber are movable relative to each other between a first position, in which the susceptor is positioned relative to the furnace chamber, and a second position in which the susceptor is positioned further retracted from the furnace chamber relative to the first position.

The invention is advantageous in that it allows sintering of dental ceramics, in particular zirconia, by use of microwaves without an additional heating system like electric resistant elements or burners. Further, the invention helps minimizing the sintering time for the sintering of dental ceramics, in particular zirconia. The invention is further advantageous in that the time for heating the object toward the required sintering temperature is minimized while the uniformity of any temperature gradients within the object is maximized. This is in contrast to conventional thermal sintering because microwaves typically can penetrate into the object and thereby can heat up inner and outer portions of the object independently and simultaneously (volume heating effect). The invention is advantageous in that it enables the sintering a maximized sintering quality. In particular, the invention can be used to provide a sintered ceramic material having a relatively homogeneous material structure that exhibits relatively good translucency and material strength.

In an embodiment the microwave source and the susceptor are movable relative to each other. Preferably, in the second position of the susceptor and the furnace chamber, the susceptor and the microwave source are spaced farther apart than in the first position of the susceptor and the furnace chamber. The microwave source and the furnace chamber may be arranged in a fixed relationship to each other while the susceptor may be movable relative to the furnace chamber and the microwave source. The susceptor may be movable relative to the furnace chamber and the microwave source particularly during use of the microwave furnace for sintering an object. With this concept, the susceptor can be simultaneously retracted from the furnace chamber and brought into a farther remote position to the microwave source. In the farther remote position typically less microwave energy couples into the susceptor. Accordingly, a lower fraction of microwave energy is absorbed by the susceptor and therefore remains available for directly sintering the object by microwaves. The skilled person may recognize further configurations in which the furnace chamber, the microwave and/or the susceptor are movable as appropriate without departing from the invention.

In an embodiment the microwave furnace is adapted such that the furnace chamber can be opened and closed. The susceptor and the sintering platform are preferably movable relative to each other during the furnace chamber is closed. The sintering platform is preferably formed by a surface of a support. The support and the housing are preferably movable or positionable relative to each other for opening and/or closing the furnace chamber. In particular the support and the housing are preferably positionable in a closed position in which the sintering platform is flush with the opening of the housing or located inside the housing. The support and the housing are preferably further positionable in an open position in which the sintering platform is spaced from the opening of the housing. Thus, in the closed position the sintering platform closes the furnace chamber, whereas in the open position an object to be sintered is placeable from outside of the furnace chamber on the sintering platform into the furnace chamber.

The susceptor and the furnace chamber are preferably movable in the closed position of the sintering platform and the housing. In particular, the susceptor and the furnace chamber are preferably movable during sintering of an object in the furnace chamber.

In one embodiment the microwave furnace has a stand which suspends the housing. The susceptor and the sintering platform are preferably each movable and/or positionable relative to the housing. The housing may be cap-shaped, in particular may have a circumferential side wall and a top wall, and may form an opening adjacent a bottom side of the housing. In this regard the terms "top" and "bottom" refer to locations in directions further away and further toward the center of gravity of the earth, respectively. The microwave furnace may further have a base from which the stand extends. Accordingly, in this embodiment the housing is stationary and the susceptor and the platform each are movable relative to the housing and to each other. This facilitates the integration of the microwave source in the housing and electrical connection of the microwave source.

In an embodiment the microwave furnace has a thermal insulation. In particular, the housing may be inwardly lined with an insulator, for example a ceramic fiber material. The insulation liner preferably forms a contiguously cap-shaped structure.

In a further embodiment the microwave furnace further preferably has a microwave shielding. For example the housing may, outwardly of the thermal insulation, have a contiguous cap-shaped shell made of a metal which forms at least part of the shielding. The microwave furnace may have a further metal shell for shielding any areas not entirely shielded by the housing.

In one embodiment the susceptor extends in the furnace chamber in the first position. For example the susceptor may by position partially or entirely within the furnace chamber. Thus, when the microwave source is activated the susceptor is heated by the microwaves and therefore heats the furnace chamber by thermal transfer (for example thermal radiation and thermal convection).

In a further embodiment the susceptor is positioned outside the furnace chamber in the second position. In this regard a surface of the susceptor may delimit the furnace chamber with the remainder of the susceptor being located outside the furnace chamber. Accordingly, with the microwave source being arranged in the housing, the distance between the susceptor and the microwave source in the second position is greater than the distance between the susceptor and the microwave source in the first position. Thus, in the second position the susceptor is preferably spaced away far enough so that it is not significantly heated by the microwave source.

In a further embodiment the microwave furnace is configured for halting the susceptor in determined intermediate positions of the first and second position. Preferably, the susceptor and the sintering platform (or support) are independently positionable. The microwave furnace is preferably configured to control the position of the susceptor and the sintering platform, for example with stepping motors and/or linear decoders as they are used for example in a CNC machine.

In an embodiment the susceptor is arranged in a gap between the platform and the housing. The susceptor in the first position preferably surrounds a space in which the platform faces. The object to be sintered is preferably placeable in this space. Further, the susceptor preferably extends generally straight along a longitudinal axis at a ring-shaped cross-section.

In one embodiment the susceptor has a hollow-cylindrical shape. The housing, the susceptor and the sintering platform are preferably shaped so that they movably fit into each other. Such fit (between the housing and the susceptor as well as between the susceptor and the sintering platform) is preferably a loose fit, respectively, to avoid friction between the housing and the susceptor and the susceptor and the sintering platform. Nevertheless any gap between the housing and the susceptor and/or the susceptor and the sintering platform, respectively, is preferably minimized to ensure appropriate thermal insulation of the furnace chamber. With respect to an axis of symmetry (corresponding to the longitudinal axis) of the hollow-cylindrical susceptor the susceptor and the housing as well as the susceptor and the sintering platform are preferably movable relative to each other in a dimension along the axis of symmetry or longitudinal axis. The hollow-cylindrical shape of the susceptor provides for a relatively uniform emission of heat of the (heated) susceptor toward the space inside of the susceptor.

In an embodiment the susceptor may be composed of two or more segments which optionally are movable relative to each other. For example, the susceptor may comprise 2, 4, 6 or 12 segments each extending over 180, 90, 60 or 30 degrees, respectively, and complementing to the hollow-cylindrical shape. The angles are measured in a plane perpendicular to the axis of symmetry. The skilled person will recognize other shapes of the susceptor, for example a susceptor that extends square-shaped, rectangular or oval, depending on the shape of the objects that are typically sintered in the microwave furnace.

In a preferred embodiment the susceptor comprises or is formed of silicon carbide (SiC). Silicon carbide has a thermal stability of approximately 2000° C. and therefore can be heated up toward a desired sintering temperature of about 1500° C. to 1600° C. as required for sintering zirconia materials In a further embodiment the microwave furnace has a control system for controlling the operation of the microwave furnace. The microwave furnace is preferably configured for moving the susceptor by control of the control system. The microwave may further have a temperature sensor. The temperature sensor may be adapted for capturing a temperature of an object placed on the sintering platform and/or the temperature of the susceptor. The control system may be configured to move the susceptor based on a temperature measured by the temperature sensor. In particular, the control system may monitor the temperature of the object to be sintered and may position the susceptor in the first position in a first sintering temperature range, or in the second position in a second sintering temperature range. The first sintering temperature range is preferably lower than the second sintering temperature range. The first sintering temperature range may be about at least 23° C. to about 700° C. whereas the second sintering temperature range may be about 701° C. to about 1600° C. The control system may additionally or alternatively be configured to move the susceptor based on a (programmable) time program or by manual input in the control system.

In an embodiment the microwave source is based on a magnetron for generating electromagnetic waves of a frequency of between 300 MHz and 300 GHz. Safety requirements including particular microwave frequencies are defined by national or local authorities, for example in standards such as e.g. IEEE 802.16 or in e-CFR 1030.10. Commercially available microwave devices typically operate in the range of 2.3 GHz, 2.5 GHz, 3.5 GHz and 5.8 GHz. The microwave source is preferably the only energy source of the microwave furnace for sintering.

In one embodiment the microwave furnace comprises the object. The object may be a dental or orthodontic workpiece comprising zirconia, for example a dental restoration, an orthodontic bracket or precursors thereof.

In a further aspect the invention relates to a method of sintering zirconia. The method comprises the steps of:
- providing an object made of zirconia on a sintering platform in a furnace chamber of a microwave furnace;
- positioning a susceptor to a first position in which at least part of the susceptor is arranged within the furnace chamber;
- emitting microwaves into the furnace chamber;
- positioning the susceptor to a second position in which the part of the susceptor is arranged outside the furnace chamber.

Preferably, the method comprises the steps of providing the microwave furnace according the invention and providing the object on the sintering platform of the microwave furnace of the invention.

In one embodiment the object is a dental or orthodontic workpiece comprising zirconia, for example a dental restoration, an orthodontic bracket or precursors thereof.

In an embodiment in the second position the susceptor is arranged farther away from the microwave source than in the first position. In the second position thus the exposure of the susceptor by microwaves is lower than in the first position.

In an embodiment the method further comprises the steps of:
- providing a susceptor with a pre-determined heat capacity;
- heating up the susceptor to a pre-determined temperature; and
- using the heat capacity of the susceptor to heat the object to sintering temperature.

In an embodiment the positioning from the first to the second position is performed simultaneously to emitting microwaves into the furnace chamber.

In a further aspect the invention relates to a method of sintering and object. The method comprises the steps of first sintering an object through heating by thermal radiation and subsequently sintering the same object by microwave energy. Preferably, these two steps are preformed timely directly adjacent each other. It is encompassed that the method comprises the steps of first sintering an object predominantly through heating by thermal radiation and subsequently sintering the same object predominantly by microwave energy. Preferably, these two steps are preformed timely directly adjacent each other.

The time for heating a zirconia sample of the size of 10 mm×10 mm×10 mm (=1 cm³) may be between about 80 minutes to about 10 minutes.

DETAILED DESCRIPTION OF THE INVENTION

Figure 1:
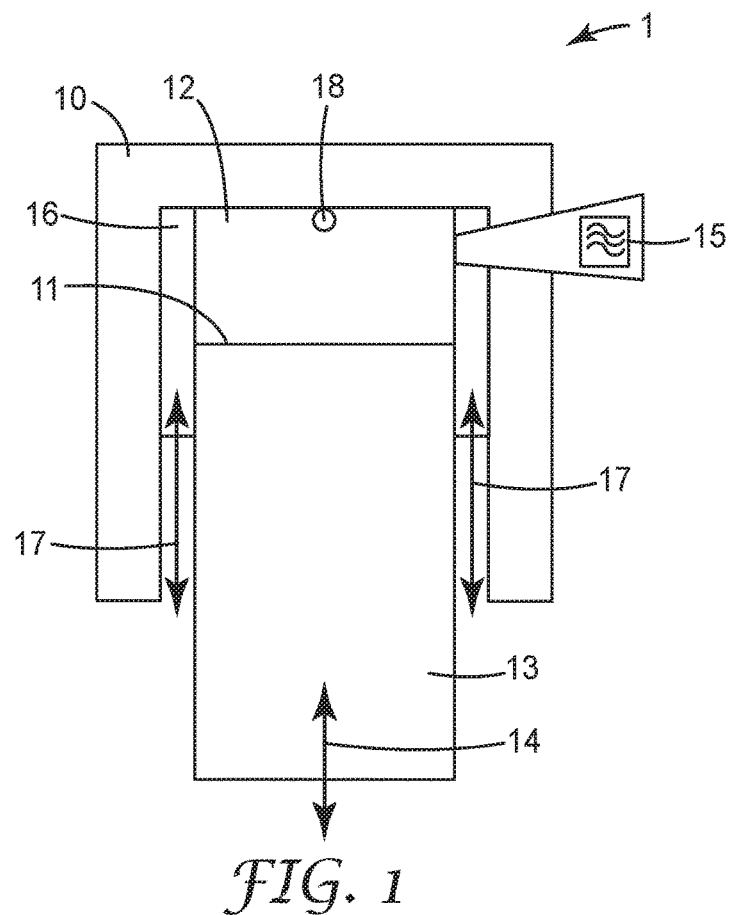
FIG. 1 is a schematic cross-sectional view of a microwave furnace according to an embodiment of the invention.

FIG. 1 shows a microwave furnace 1 according to an embodiment of the invention. The microwave furnace 1 has a housing 10, and a sintering platform 11 arranged within the housing 10. A furnace chamber 12 is formed between the housing 10 and the sintering platform 11. In the example the housing 10 is cup-shaped with the sintering platform 11 arranged within the open recess formed by the cup-shape. The housing 10 is arranged with the opening facing down (in a direction of the force of gravity). Although not illustrated in detail, the microwave furnace 1 is configured such that the housing 10 can be opened for inserting an object to be sintered into the furnace chamber 12. While the skilled person will recognize several solutions for a microwave furnace in which the chamber can be user-selectively opened or closed, in a preferred example the housing 10 is suspended at a stand (not shown) of the sintering furnace and the sintering platform 11 is vertically movable (indicated by arrows 14) into the housing 10 for closing the furnace chamber 12 or outside the furnace chamber 12 for opening the furnace chamber. Alternatively, the housing 10 may be configured so that it can be lifted or swung open via a hinge. A combination of a movable housing and a movable sintering platform is possible.

Further, the housing 10 may have a portion, for example a door or a hood, which can be opened and closed for inserting an object to be sintered into the furnace chamber.

The housing 10 is preferably thermally insulated, for example by a ceramic fiber material, so as to avoid temperatures of above 40° C. on outer surfaces of the housing 10 during operation of the microwave furnace 1 over several hours at temperature range in which the sintering furnace 1 can operate. Such temperature range may be from room temperature (23° C.) up to a temperature of approximately 1560° C. within the furnace chamber 12.

The sintering platform 11 is generally flat or planar and formed by a surface of a support 13 arranged within the microwave furnace 1. The sintering platform 11 as well as an inner wall of the housing 11 facing the furnace chamber 12 is made of ceramic material which does not couple into microwaves within the temperature range in which the sintering furnace 1 can operate. A common ceramic material used for insulation as well as for forming surfaces of sintering furnaces is based on aluminum oxide. The sintering platform 11 is arranged generally horizontally.

The sintering furnace 1 has a microwave source 15. The microwave source 15 comprises a magnetron which is configured for generating microwaves. The microwave source 15 may extend through a side of the housing 10 as shown. Alternatively, microwave source 15 may extend through a top of the housing 10, opposite of the sintering platform 11. More than one magnetron may be used as appropriate.

The sintering furnace 1 further has a susceptor 16. The susceptor 16 is made of a material which couples into microwaves in a temperature range of at least 23° C. to 700°

C. This enables the susceptor 16 to be heated by the microwave source 15. In the example the susceptor has a hollow-cylindrical shape. This provides for a relatively uniform radiation of heat from the susceptor 16 toward the space formed inside the susceptor 16. The susceptor 16 is preferably made of silicon carbide (SiC). Silicon carbide further has a thermal stability of approximately 2000° C. and therefore can be heated up easily toward a desired sintering temperature of about 1500° C. to 1600° C. as required for sintering zirconia materials. As indicated by the arrow 17, the susceptor is movable relative to the furnace chamber 12. In particular, the sintering platform 12 (formed by the support 13), the housing 10 and the susceptor 16 are telescopically movable relative to each other. The sintering platform 11 and/or the support are preferably circular in cross-section and dimensioned to form a precise fit with the inside of the susceptor 16. Such precise fit accounts for shrinkage or expansion of the susceptor 16 and the support 13 as well as for any powder which may get into a gap between the susceptor 16 and the support 13. Accordingly the precise fit includes a gap of up to 1 mm between the susceptor 16 and the support 13. Thus, any blocking between the susceptor 16 and the support 13 is prevented while sufficient thermal insulation is still achieved. The inside of the housing 10 further has a circular cross-section and is dimensioned to form a precise fit with the outside of the susceptor. Again such precise fit accounts for shrinkage or expansion of the susceptor 16 and the housing 10 as well as for any powder which may get into a gap between the susceptor 16 and the housing 10, and may include a gap of up to 1 mm.

In the example the support 13 and the susceptor 16 are independently moveable relative to each other. In particular, each of the support 13 and the susceptor 16 is coupled to a motor driven linear drive (not shown). The linear drive preferably comprises a travel measuring or travel control, for example comprising a stepper motor and/or a linear decoder. In the situation shown, the susceptor 16 is positioned in a first position which in the example is an upper extreme position, for example in which the susceptor 16 abuts the top side of the housing 10. In the first position of the example the susceptor 16 entirely covers the inner side wall of the housing 10. In this position the susceptor 16 is also positioned within the furnace chamber 12. In the situation shown the furnace chamber 12 can be heated by the susceptor 16 which is heated by the microwave source 15.

Figure 2:
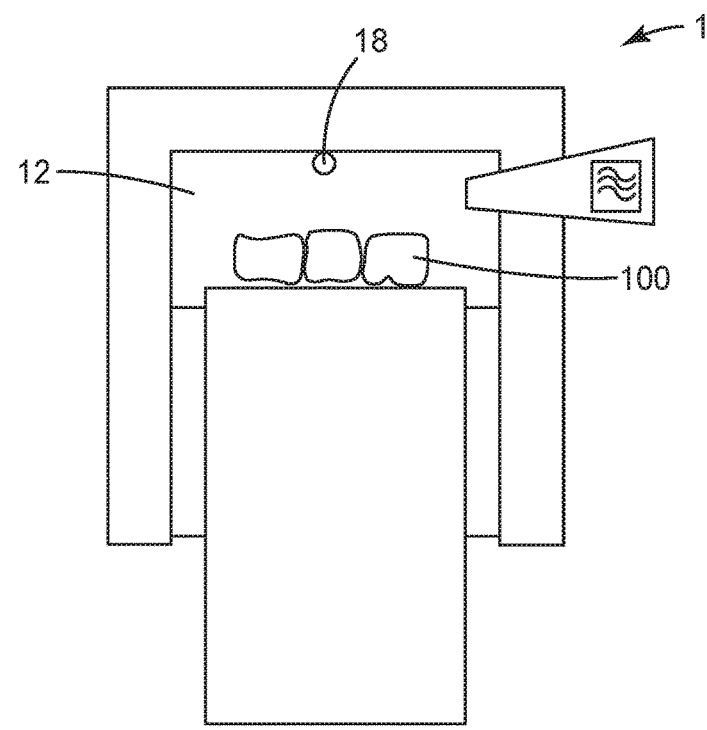
FIG. 2 is a schematic cross-sectional view of the microwave furnace of FIG. 1 in a different mode of operation.

FIG. 2 shows the same sintering furnace 1 as in FIG. 1, but with the susceptor 16 positioned in a second position. In the second position the susceptor 16 is retracted from the furnace chamber 12. In the example, in the second position the susceptor 16 is entirely retracted from the furnace chamber 12 so that the susceptor does not extend into the furnace chamber 12. It is noted that nevertheless a surface of the susceptor 16 may form a wall which delimits or (at least thermally) seals the furnace chamber 12. Further, a dental restoration 100 (or a precursor thereof) is placed in the furnace chamber 12. With the susceptor 16 positioned outside the furnace chamber 12 the dental restoration 100 is predominantly exposed to the microwaves generated by the microwave source 15. Further, because the susceptor 16 is positioned farther away from the microwave source 15, the energy supply into the susceptor 16 is lower (and may in particular be insignificant) relative to the first position. Accordingly, a dental restoration (or other object) placed in the furnace chamber 12 may be heated generally only be microwave energy in the second position of the susceptor 16, if the dental restoration or object is made of a material that couples into microwaves.

The microwave furnace 1 has a temperature sensor 18, for example an optical sensor directed toward the sintering platform 11, for measuring a temperature of the dental restoration 100 (or other object). The microwave furnace 1 is configured to control the power of the microwave source 15 dependent on the temperature measured by the sensor 18. Further, the microwave furnace 1 is configured to control the movement of the susceptor 16 dependent on the temperature measured by the sensor 18 as explained in further detail below.

Figure 3:
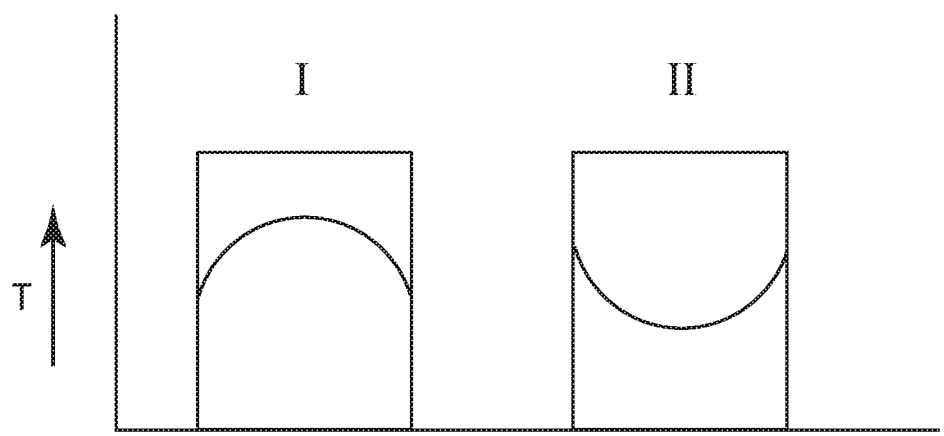
FIG. 3 is a diagram illustrating temperature profiles for microwave sintering in comparison to sintering by thermal transfer.

FIG. 3 illustrates in a diagram the heating effect for a cylindrical zirconia material placed in the microwave furnace shown in FIGS. 1 and 2. In particular the diagram shows a temperature profile II for a situation in which the microwave furnace is operated in the first position of the susceptor 16 (FIG. 1), and a temperature profile I for a situation in which the microwave furnace is operated in the second position of the susceptor 16 (FIG. 2). Due to the fact that zirconia does not couple into microwaves at low temperatures the zirconia material may be heated in the microwave furnace with the susceptor positioned in the first position. During heating by radiation (and convection) via the susceptor the temperature profile II is characterized by higher temperatures toward an outside of the zirconia material and lower temperatures toward the center. Once the zirconia has reached a temperature of approximately 650° C.-700° C. the zirconia starts to couple into the microwaves so that the susceptor may be brought in the second position. In this situation the zirconia material may be further heated by substantially only microwave energy. During heating of the zirconia material via the microwave source the temperature profile I is characterized by lower temperatures toward an outside of the zirconia material and higher temperatures toward the center. The direction of increasing temperatures is indicated by T in the diagram.

Figure 4:
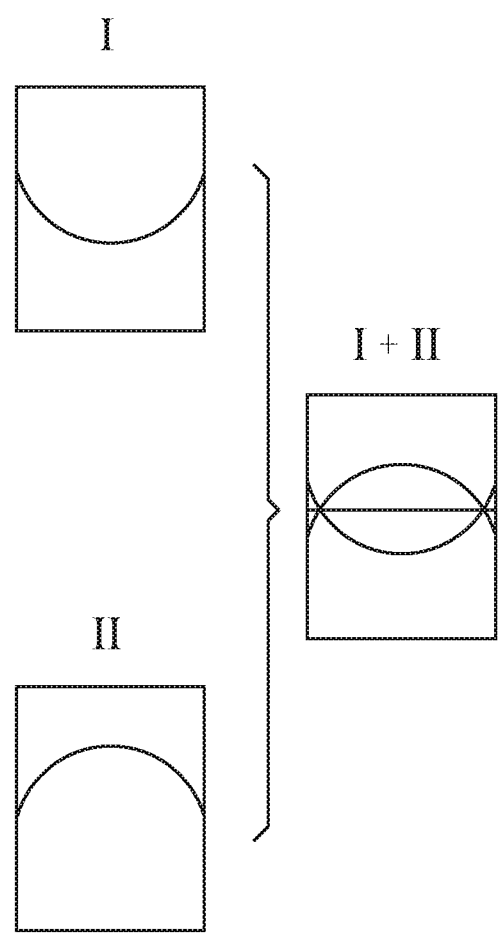
FIG. 4 is a diagram illustrating temperature profiles for microwave sintering, sintering by thermal transfer and the combination thereof.

FIG. 4 illustrates the finding that the heating with the susceptor in the first and second position may be combined to superpose the different temperature profiles I and II as shown in FIG. 3. The superposed temperature profiles I and II are illustrated as combined temperature profile I+II. The combined temperature profile I+II was found to be more uniform through the zirconia compared to the individual temperature profiles I and II (although an exact straight or uniform profile may not be reached in practice).

Figure 5A:
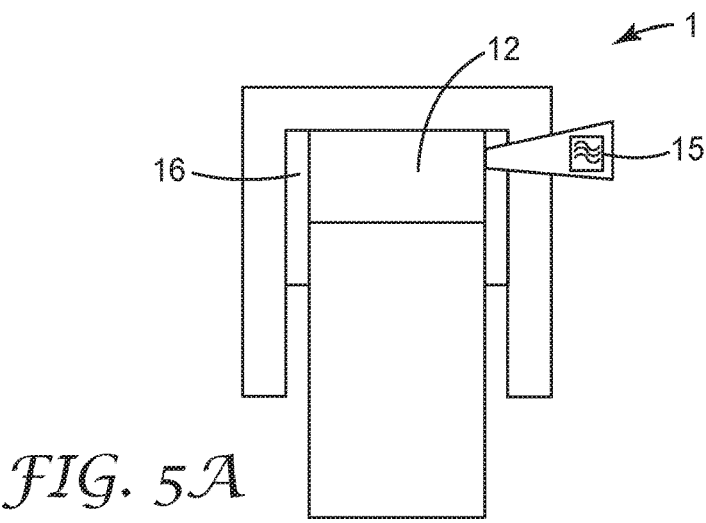
FIG. 5 is a schematic view illustrating the method of the invention.
Figure 5B:
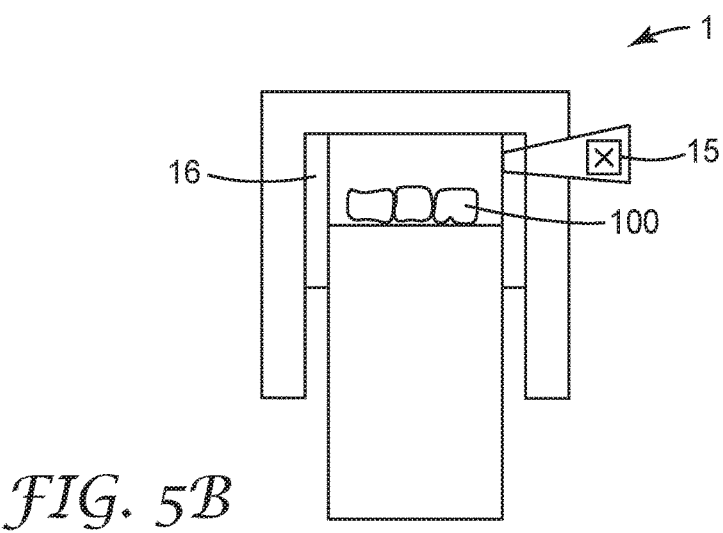
Figure 5C:
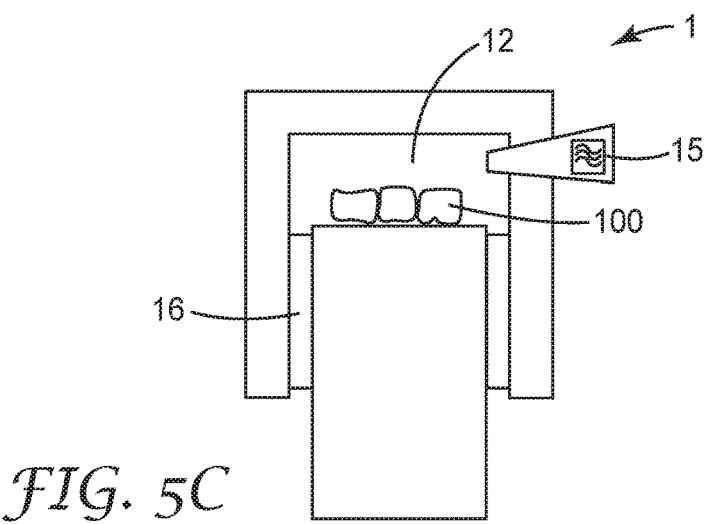

FIG. 5 illustrates a method of sintering a zirconia material according to the invention. In a step A the microwave source 15 is activated and the susceptor 16 is positioned in the first position. Thus, the susceptor 16 is pre-heated, preferably toward a temperature of about 750° C. After the pre-heating temperature is reached a precursor 100' of a dental restoration made of zirconia is placed in the furnace chamber 12. Such a precursor 100' is typically a pre-sintered, still open-porous material which by heating toward 1580° C. can be converted toward a fully dense material. At the point the dental restoration precursor 100' is placed in the microwave furnace 1 the furnace chamber 12 still is not heated up to very high temperatures so that any sudden temperature drop from opening the furnace chamber will be also limited. This helps minimizing any degradation of the inner walls and/or the insulation of the furnace and therefore helps maximizing the life time of the furnace.

In step B the microwave source 15 is deactivated and the susceptor 16 is positioned in the first position. Thus, the dental restoration precursor 100' is exposed to heat emitted (mainly radiated) from the susceptor only. Accordingly, the dental restoration precursor 100' heats up according to temperature profile I of FIG. 3. Upon the dental restoration precursor 100' reaching an outer temperature of about 700° C. the susceptor 16 is retracted to the second position and the microwave source 15 is activated as illustrated in step C. In step C the dental restoration precursor 100' is exposed to substantially only microwaves generated by the microwave source 15. This causes the inner portions of the dental restoration precursor 100' to heat up more than outer portions according to the temperature profile II in FIG. 3. Due to the initial heating via the susceptor the heat profile of the heating by microwaves compensates with the heat profile cause by the initial heating in a temperature area above 700° C. To avoid generating a temperature profile similar to the profile II in FIG. 3 upon further heating by only microwaves, steps B and C may be alternately activated to successively heat up the dental restoration precursor 100' via the susceptor and via microwaves. It has been found that this method allows for rapidly heating zirconia material at maximized uniformity of the temperature distribution in the material and therefor at maximized uniformity of the material structure. This also typically leads to achieving a sintered material having maximized translucency and strength.

What is claimed is:

1. A microwave furnace comprising:
    a furnace chamber formed between a chamber housing and a sintering platform for an object to be sintered;
    a microwave source arranged for emitting microwaves into the furnace chamber;
    a susceptor comprising a material which over a temperature range of the material of at least 23° C. to 700° C. couples into microwaves,
    wherein the susceptor and the furnace chamber are movable relative to each other between a first position, in which the susceptor is positioned relative to the furnace chamber, and a second position in which the susceptor is positioned further retracted from the furnace chamber relative to the first position.

2. The microwave furnace of claim 1, wherein the furnace chamber can be opened and closed, and wherein the susceptor and the sintering platform are movable relative to each other during the furnace chamber is closed.

3. The microwave furnace of claim 1, wherein the susceptor extends in the furnace chamber in the first position, and wherein the susceptor is positioned outside the furnace chamber in the second position.

4. The microwave furnace of claim 1, being configured for halting the susceptor in determined intermediate positions of the first and second position.

5. The microwave furnace of claim 1, wherein the susceptor is arranged in a gap between the platform and the housing.

6. The microwave furnace of claim 1, wherein the susceptor in the first position surrounds a space in which the platform faces.

7. The microwave furnace of claim 6, wherein the susceptor extends generally straight along a longitudinal axis at a ring-shaped cross-section.

8. The microwave furnace of claim 1, wherein the susceptor comprises silicon carbide (SiC).

9. The microwave furnace of claim 1, having a control system for controlling the operation of the microwave furnace, wherein the microwave furnace is configured for moving the susceptor by control of the control system.

10. The microwave furnace of claim 9, having a temperature sensor, wherein the control system is configured to move the susceptor based on a temperature measured by the temperature sensor.

11. The microwave furnace of claim 1, wherein the microwave source is based on a magnetron for generating electromagnetic waves of a frequency of between 300 MHz and 300 GHz.

12. The microwave furnace of any of claim 1, wherein the microwave source is the only energy source of the microwave furnace for sintering.

13. A method of sintering zirconia comprising:
    providing an object made of zirconia on a sintering platform in a furnace chamber of a microwave furnace;
    positioning a susceptor to a first position in which at least part of the susceptor is arranged within the furnace chamber;
    emitting microwaves into the furnace chamber; and
    positioning the susceptor to a second position in which the part of the susceptor is arranged outside the furnace chamber.

14. The method of claim 13, wherein the positioning from the first to the second position is performed simultaneously to emitting microwaves into the furnace chamber.

15. The method of claim 13, wherein the object is a dental or orthodontic workpiece comprising zirconia, for example a dental restoration, an orthodontic bracket or precursors thereof.

16. The method of claim 13, wherein prior to the step of emitting microwaves into the furnace chamber the method comprises sintering the object through heating by thermal radiation.

* * * * *